US012493752B2

(12) United States Patent
Zhou et al.

(10) Patent No.: US 12,493,752 B2
(45) Date of Patent: Dec. 9, 2025

(54) AUTOMATIC CONCRETE DAM DEFECT IMAGE DESCRIPTION GENERATION METHOD BASED ON GRAPH ATTENTION NETWORK

(71) Applicants: Huaneng Lancang River Hydropower Inc, Yunnan (CN); Hohai University, Jiangsu (CN); HUANENG GROUP R&D CENTER CO., LTD., Beijing (CN)

(72) Inventors: Hua Zhou, Yunnan (CN); Fudong Chi, Yunnan (CN); Yingchi Mao, Yunnan (CN); Hao Chen, Yunnan (CN); Xu Wan, Yunnan (CN); Huan Zhao, Yunnan (CN); Bohui Pang, Yunnan (CN); Jiyuan Yu, Yunnan (CN); Rui Guo, Yunnan (CN); Guangyao Wu, Yunnan (CN); Shunbo Wang, Yunnan (CN)

(73) Assignees: Huaneng Lancang River Hydropower Inc, Kunming (CN); Hohai Univerdity, Nanjing (CN); HUANENG GROUP R&D CENTER CO., LTD., Beijing (CN)

( * ) Notice: Subject to any disclaimer, the term of this patent is extended or adjusted under 35 U.S.C. 154(b) by 252 days.

(21) Appl. No.: 18/327,074

(22) Filed: Jun. 1, 2023

(65) Prior Publication Data
US 2023/0401390 A1 Dec. 14, 2023

Related U.S. Application Data

(63) Continuation of application No. PCT/CN2023/093220, filed on May 10, 2023.

(30) Foreign Application Priority Data

Jun. 13, 2022 (CN) .......................... 202210664943.9

(51) Int. Cl.
*G06F 40/40* (2020.01)
*G06T 7/00* (2017.01)
(Continued)

(52) U.S. Cl.
CPC ............ *G06F 40/40* (2020.01); *G06T 7/0002* (2013.01); *G06V 10/42* (2022.01); *G06V 10/774* (2022.01);
(Continued)

(58) Field of Classification Search
CPC ................... G06F 40/40; G06T 7/0002; G06T 2207/20081; G06T 2207/20084;
(Continued)

(56) References Cited

U.S. PATENT DOCUMENTS

2020/0175053 A1* 6/2020 Zheng ..................... G06N 5/046
2020/0324794 A1* 10/2020 Ma ................... B60W 60/00272
(Continued)

FOREIGN PATENT DOCUMENTS

CN 111597819 A * 8/2020 ............. G06N 3/045

OTHER PUBLICATIONS

Miao, Yalin, et al. "Research on visual question answering based on GAT relational reasoning." Neural Processing Letters (2022): 1-14.*
(Continued)

*Primary Examiner* — Xuemei G Chen

(57) ABSTRACT

An automatic concrete dam defect image description generation method based on graph attention network, including: 1) extract the local grid features and whole image features of the defect image and conduct image coding by using multi-layer convolutional neural network; 2) construct the grid feature interaction graph, and fuse and encode the grid visual features and global image features of the defect image; 3) update and optimize the global and local features through the graph attention network, and fully utilize the improved
(Continued)

visual features for defect description. The invention constructs the grid feature interaction graph, updates the node information by using the graph attention network, and realizes the feature extraction task as the graph node classification task. The invention can capture the global image information of the defect image and the potential interaction of local grid features, and the generated description text can accurately and coherently describe the defect information.

10 Claims, 2 Drawing Sheets

(51) Int. Cl.
  *G06V 10/42*    (2022.01)
  *G06V 10/774*    (2022.01)
  *G06V 10/82*    (2022.01)

(52) U.S. Cl.
  CPC .... *G06V 10/82* (2022.01); *G06T 2207/20081* (2013.01); *G06T 2207/20084* (2013.01); *G06T 2207/30184* (2013.01)

(58) Field of Classification Search
  CPC . G06T 2207/30184; G06T 2207/20072; G06T 2207/30132; G06T 7/0004; G06V 10/42; G06V 10/774; G06V 10/82; G06V 10/25; G06V 10/454; G06V 10/764
  See application file for complete search history.

(56) References Cited

U.S. PATENT DOCUMENTS

| | | | |
|---|---|---|---|
| 2021/0042579 A1* | 2/2021 | Chen | G06V 10/82 |
| 2021/0056742 A1* | 2/2021 | Sikka | G06F 16/51 |
| 2021/0232773 A1* | 7/2021 | Wang | G06F 18/21 |
| 2022/0014807 A1* | 1/2022 | Lin | G06N 3/044 |
| 2022/0147838 A1* | 5/2022 | Gu | G06V 20/00 |
| 2022/0270359 A1* | 8/2022 | Pan | G06V 10/80 |
| 2022/0404153 A1* | 12/2022 | Meng | G06V 10/7747 |
| 2023/0005178 A1* | 1/2023 | Liu | G06V 30/274 |
| 2023/0020834 A1* | 1/2023 | Chatterjee | G06N 3/08 |
| 2023/0305863 A1* | 9/2023 | Riva | G06F 40/284 |

OTHER PUBLICATIONS

Jiang H, Misra I, Rohrbach M, Learned-Miller E, Chen X. In defense of grid features for visual question answering. In Proceedings of the IEEE/CVF conference on computer vision and pattern recognition 2020 (pp. 10267-10276).*

Li L, Tang S, Deng L, Zhang Y, Tian Q. Image caption with global-local attention. In Proceedings of the AAAI conference on artificial intelligence Feb. 12, 2017 (vol. 31, No. 1).*

* cited by examiner

AUTOMATIC CONCRETE DAM DEFECT IMAGE DESCRIPTION GENERATION METHOD BASED ON GRAPH ATTENTION NETWORK

TECHNICAL FIELD

The invention relates to an automatic concrete dam defect image description generation method based on graph attention network, in particular to a method of automatically generating natural language description for input concrete dam defect image, belonging to the multi-modal technical field of computer vision and natural language processing.

BACKGROUND ART

Hundreds of concrete gravity dams have been built in China, the dams are always in the process of aging damage evolution and new damage formation under the long-term action of external environment, and the surface defects of the dams often reflect their aging condition, so it is necessary to carry out surface defect detection regularly to evaluate their evolution. The power industry standard of the People's Republic of China, Technical Specification for Concrete Dam Safety Monitoring clearly states that specialists shall be appointed to conduct regular inspection and safety evaluation of concrete dams, and issue necessary special inspection reports and summary reports to maintain the safe operation of dams. However, the defect identification of concrete dams has not been studied.

In recent years, region-based visual feature has become a major method for visual-linguistic tasks such as image description generation. Compared with the whole image, the grid features of the image contain more fine-grained objects, which is more conducive to identifying the defects of concrete dams. Coding the defect content related to fine-grained objects will undoubtedly optimize the defect identification and obtain a more specific and accurate representation of defect features. The existing research focus is to model the interaction between visual and linguistic features through the attention mechanism to obtain a richer and more reliable image description. Although the most relevant image features can be focused in the description generation process, the interaction relationship between image features is not fully utilized. The traditional attention mechanism cannot meet the complex interaction relationship of grid features. Meanwhile, some problems exist in integrating global image information.

CONTENT OF INVENTION

Purpose of the invention: In order to preliminarily generate the follow-up inspection report in the engineering monitoring and ensure the standardized management of the inspection process, the invention develops an automatic concrete dam defect image description generation method based on graph attention network according to the characteristics of uncertain concrete surface defect types and different geometric forms. As the visual representation generated by image description, the grid features have certain advantages. However, the local receptive field of the grid features is small, and the convolutional neural network can only learn local features of targets, lacking spatial and global information. In order to better use the grid features as the main visual representation of the image description generation model, the introduction of global features to guide the optimization and updating of grid features can improve the accuracy of visual representation. Therefore, the invention proposes a new concrete defect assessment process giving consideration to global coverage and local location, realizes the extraction of visual features as a node classification task, enhances the visual representation ability by means of global image features, extracts the information by combining the adjacent grid features with the global features through the graph attention network, effectively captures the global contextual information and the local information, improves the classification accuracy compared with the existing concrete defect image target detection method, provides an intuitive text basis for the completion of dam safety inspection report, and reduces the complexity of manual integration.

Technical proposal: An automatic concrete dam defect image description generation method based on graph attention network include the following steps:

1) Extract the global features and grid features of the defect image respectively by using the multi-layer convolutional neural network;
2) Construct the grid feature interaction graph, and input the global features and grid features as nodes;
3) Update and optimize the node information in the grid feature interaction graph constructed in 2) by using the graph attention network to get the updated global features and grid features;
4) Automatically generate the image description by using the updated global feature and grid feature sequence based on Transformer decoding module.

In Step 1), Faster R-CNN model pre-trained on Visual Genome data set is used to extract the global features and grid features, and especially uses the ordinary convolutional layer C5 with the stride of 1 and 1×1 RoIPool with two FC layers as detection heads, and the output of the layer C5 is used as the grid feature of the defect image.

In Step 2), the dependency among grid features and the global features are introduced, the grid feature interaction graph is established by means of the global node mechanism, and the grid feature interaction graph is constructed as follows: the global features and grid features obtained in Step 1) are used as the node inputs of the grid feature interaction graph to obtain one global node and multiple local nodes; the global node serves as the virtual center and is connected to all nodes in the graph; the local nodes are connected according to the relative center coordinates of the grid, namely, the value (i,j) of two adjacent grid nodes i and j in the adjacency matrix A is assigned as 1, indicating direct interaction, while the value of non-adjacent nodes is assigned as 0, indicating no interaction; the proposed global node mechanism can collect and distribute general information from the local nodes.

In Step 1), the grid features and global features of the defect image are extracted for image coding by using the multi-layer convolutional neural network: add the global features of the feature graph on the basis of fusing the grid features, and extract the global features and grid features of the defect image; specifically, define the input as a defect image $p_0$=full_image and n fixed size Grids=$(p_1, p_2, \ldots, p_n)$, extract the defect features by using Faster R-CNN model pre-trained on the Visual Genome data set, and use the convolutional layer C5 with the stride of 1 and 1×1 RoIPool with two FC layers as detection heads, in which the output of the layer C5 is embedded in $IE_{0:n}=CNN(p_{0:n}; \Theta_{CNN})$ as the extracted defect image, and image embedding is the image feature obtained by coding, which refers to the grid feature of the defect image in this paper; $\Theta_{CNN}$ represents the parameter of CNN model, IE includes global image embedding $IE_{Global}=IE_0$ and local image embedding $IE_{Local}=[IE_1, IE_2, \ldots, IE_n]$, and $p_{0:n}$ means that $p_0$=full_image and Grids=$(p_1, p_2, \ldots, p_n)$ are connected together, representing the input of the whole image and n grids.

In Step 3), the nodes of the graph attention network based on grid feature interaction graph correspond to the grid of the defect image according to the grid feature interaction graph and the graph attention network, the feature of the nodes is local image embedding, the edges of the graph correspond to the edges of the grid feature interaction graph, and the multi-head self-attention mechanism is used to fuse and update the defect information of adjacent nodes in the grid feature interaction graph.

In Step 4), Transformer decoding module comprises a reference decoding module and an optimized decoding module, the training of the reference decoding module and the optimized decoding module is divided into two stages: cross-entropy loss optimization stage and reinforcement learning stage, in which the cross-entropy loss optimization stage is based on the loss function of the negative log-likelihood estimation, and the reinforcement learning stage is based on the reinforcement learning optimization strategy and takes CIDEr score as a reward function.

Further, in Step 3), the steps for updating the nodes by using the graph attention network are as follows:

(3.1) The grid features obtained by defining the multi-layer convolutional neural network is expressed as $h=(h_1, h_2, \ldots, h_n)$, $h_i \in \mathbb{R}^F$, where n represents the number of grids, F is the feature dimension outputted by the CNN hidden layer, and $\mathbb{R}^F$ represents the vector of one F dimension;

(3.2) The feature vectors of the two grids are connected according to the adjacency matrix A, and self-attention calculation is conducted for each grid through the nonlinear layer of Leakey ReLU function, as shown in Equation (1):

$$e_{ij}=\text{Leakey ReLU}(V^T[Wh_i \oplus Wh_j]) \quad (1)$$

Where $e_{ij}$ represents the importance of the features of the grid j to the grid i, V and W are learnable parameter matrices, and $\oplus$ represents connection.

(3.3) The softmax function is used to normalize all neighborhood grid features of the grid i to obtain the attention coefficient $\alpha_{ij}$ so that makes it easy to compare the coefficients between different nodes, as shown in Equation (2):

$$\alpha_{ij} = \underset{j}{\text{soft max}}(e_{ij}) = \frac{\exp(e_{ij})}{\sum_{k \in N_i} \exp(e_{ik})} \quad (2)$$

Where $N_i$ represents all the first-order neighborhood node sets of the grid i in the grid feature interaction graph, including i itself;

(3.4) The features of all adjacent grids j to the grid i are weighted and summed with the corresponding weight coefficient $\alpha_{ij}$, and the final output features of each object node are obtained by the nonlinear layer $\sigma$, as shown in Equation (3):

$$h_i' = \sigma\left(\sum_{j \in N_i} \alpha_{ij} Wh_j\right) \quad (3)$$

(3.5) The method is extended to the multi-head self-attention mechanism in order to improve the performance of the graph attention network.

Further, in Step 4), the decoding module based on Transformer automatically generates the image description by using the updated global and grid feature sequences, specifically, the encoding information of the global features and grid features is transferred to the decoding module of Transformer model, and the decoder translates the next word wt+1 in turn according to the currently translated word sequence w1:t, thus generating the descriptive sentence w1:T corresponding to the image. Transformer decoding module comprises a reference decoding module and an optimized decoding module, the training of the reference decoding module and the optimized decoding module is divided into two stages: cross-entropy loss optimization stage and reinforcement learning stage, and the specific steps are as follows:

(4.1) In the cross-entropy loss optimization stage, the goal is to make the prediction description consistent with the annotation description; given a decoding module with manual annotation $W_{1:T}^*$ and parameter $\theta$, the following loss function is minimized:

$$L_{XE}(\theta) = -\sum_{t=1}^{T} \log(p_\theta(w_t^* | w_{1:t-1}^*)) \quad (4)$$

Where T is the length of the generated descriptive statement, $p_\theta(w_t^* | w_{1:t-1}^*)$ represents the probability of decoding module to predict the vector $w_t^*$ of the $t^{th}$ word based on the annotation sequence $w_{1:t-1}^*$ with the length of t−1, and the base number of the log is e.

(4.2) In the actual training, Transformer model is weighted and updated on a batch basis, as shown in Equation (5):

$$\text{loss} = -\frac{1}{N}\sum_{n=1}^{N} L_{XE}(\theta) \quad (5)$$

Where N is the size of the batch, loss represents the loss function, and the loss function in 4.1 is carried out for N times to better train the model.

(4.3) In the reinforcement learning stage, based on the loss function training of the negative log-likelihood estimation in Steps 4.1-4.2, the self-critical sequence training strategy is adopted to further optimize the Transformer model with CIDEr score as a reward, as shown in Equation (6):

$$L_{RL}(\theta) = -E_{w_{1:T}}p\theta[r(W_{1:T})] \quad (6)$$

Where r(·) is the original reward defined based on CIDEr score, and $w_{1:T}$ represents the generated image description sequence with the length of T, and $E_{w_{1:T}}$ represents averaging of probability of predicting the sequence with the length of T.

(4.4) The optimization goal in the reinforcement learning stage is to minimize negative expected rewards, and the gradient of average value using the rewards is updated and defined as follows:

$$b = \frac{1}{k}\left(\sum_{i}^{k} r(w_{i:T}^i)\right) \quad (7)$$

-continued $$\nabla_\theta L_{RL}(\theta) \approx -\frac{1}{k}\sum_{i=1}^{k}\left(\left(r\left(w_{1:T}^i\right)-b\right)\nabla_\theta \log p_\theta\left(w_{1:T}^i\right)\right) \quad (8)$$

Where k is the number of image description sequences, $w_{1:T}^i$ is the $i^{th}$ image description sequence, b is the average value of rewards for all image description sequences, and the base number of the log is e; $\nabla$ represents the gradient operator for derivation, and $\nabla_\theta$ is the derivation of e in $L_{RL}(\theta)$; $w_{1:T}^i$ is the $i^{th}$ image description sequence.

In the training stage of the image description generation model, cross-entropy optimization and reinforcement learning optimization are included, and the image description generated by the model is more accurate and real based on different optimization objectives.

A computer device comprises a memory, a processor and a computer program which is stored on the memory and can run on the processor, wherein the processor realizes the automatic concrete dam defect image description generation method based on the graph attention network when executing the computer program.

A computer, readable memory medium stores a computer program that performs the automatic concrete dam defect image description generation method based on the graph attention network in any of claims 1-8.

EMBODIMENTS

The invention is further described below in combination with the embodiment. It should be understood that the embodiments are used only to describe the invention but not to limit the scope of the invention. After reading the invention, any equivalent form of modification of the invention by technicians in the field falls within the scope of the claims to the application.

In order to realize the automatic concrete dam defect image description generation, the defect data set collected from the inspection of concrete dam engineering for a power station is adopted, which covers four types of defects, which are crack, seepage, alkaline precipitate, concrete spalling, and category 1 engineering characteristic hole, and 8890 images have been enhanced by data, including 12995 tag instances. 85% of the data set is used as the training set, 15% of the data is used as the test set, and each defect category is evenly distributed as far as possible.

Figure 1:
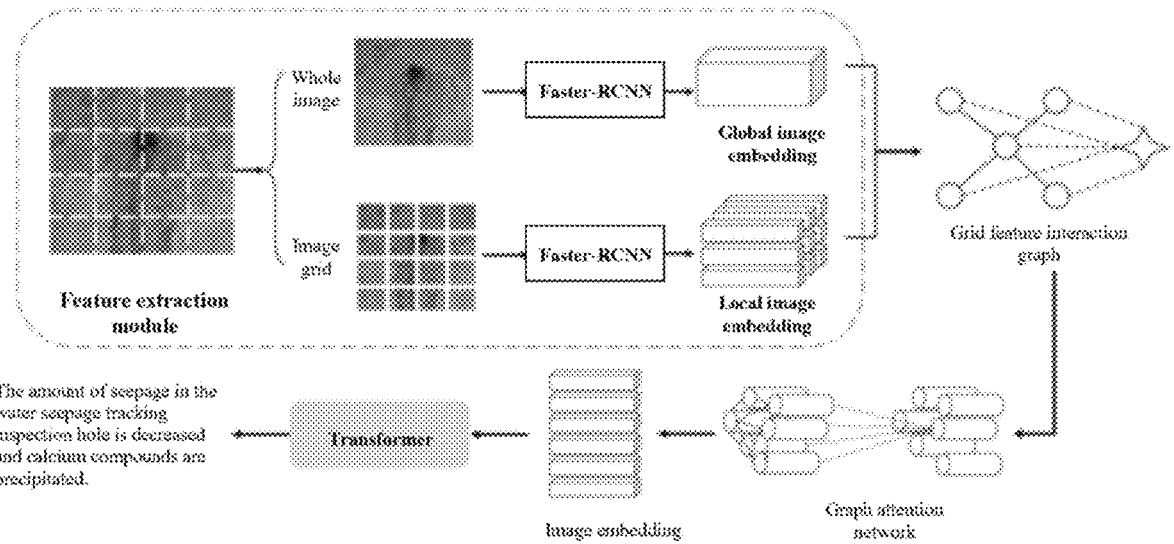
FIG. 1 is a method frame diagram for an embodiment of the invention.
Figure 2:
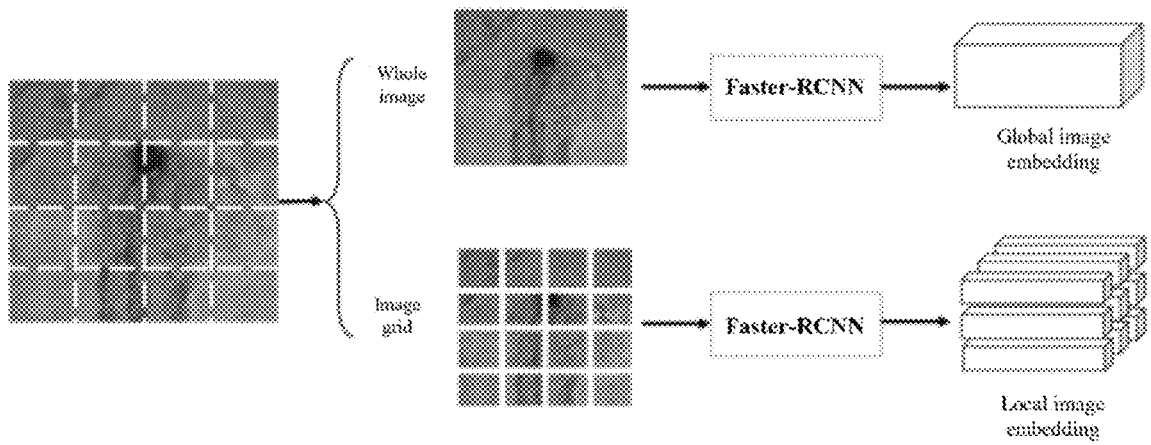
FIG. 2 is a flow chart of grid feature extraction for an embodiment of the invention.

As shown in FIG. 1, the automatic concrete dam defect image description generation method based on the graph attention network disclosed in the embodiment of the invention includes the following steps:

(1) Feature coding of defect image: The global features of the feature graph are added on the basis of fusion of grid features, and the image coding module is used for extracting the global features and grid features of the defect image, as shown in FIG. 2. Specifically, the input is defined as a defect image $p_0$=full_image and n fixed size Grids=$(p_1, p_2, \ldots, p_n)$, Faster R-CNN model pre-trained on the Visual Genome data set is used to extract the defect features, and the convolutional layer C5 with the stride of 1 and 1×1 RoIPool with two FC layers are used as detection heads, in which the output of the layer C5 is embedded in $IE_{0:n}$=CNN($p_{0:n}$;$\Theta_{CNN}$) as the extracted defect image; $\Theta_{CNN}$ represents the parameter of CNN model, and IE includes global image embedding $IE_{Global}=IE_0$ and local image embedding $IE_{Local}=[IE_1, IE_2, \ldots, IE_n]$.

Figure 3:
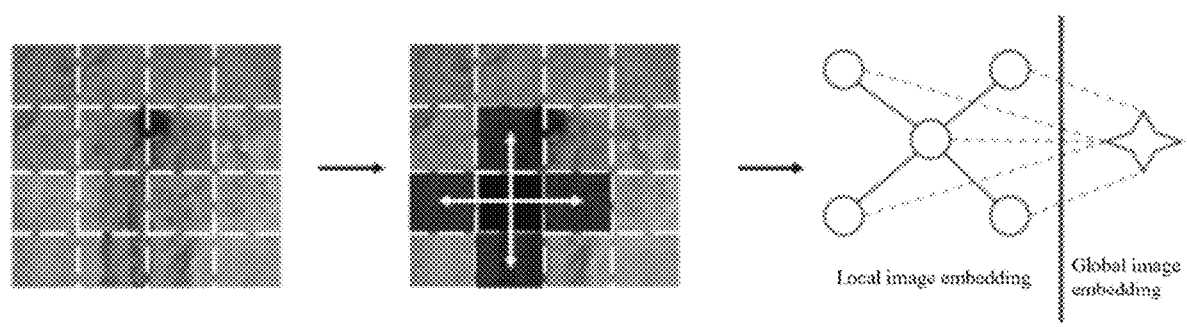
FIG. 3 is a building diagram of the grid feature interaction graph for an embodiment of the invention.

(2) Establishment of grid feature interaction graph: The dependency among grid features and the global features are introduced, the grid feature interaction graph is established by means of the global node mechanism, and the construction process is shown in FIG. 3; given the global and grid features of the image, firstly, two adjacent grids i and j are connected according to the relative center coordinates of the grid, that is, the value of (i,j) in the adjacency matrix is assigned as 1, indicating direct interaction; the global node serves as the virtual center and is connected to all nodes in the graph, and collect and distributes general information from local nodes.

Figure 4:
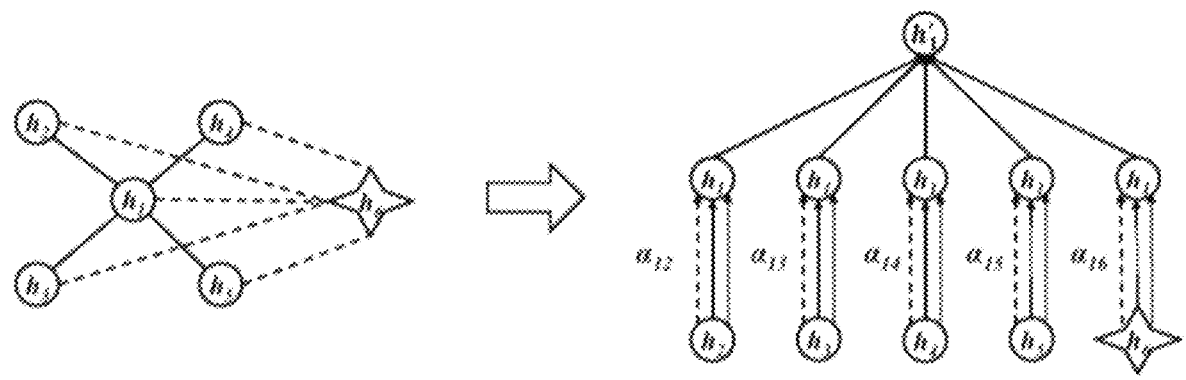
FIG. 4 is a schematic diagram of the graph attention network for an embodiment of the invention.

(3) Graph attention network based on grid feature interaction graph: According to the grid feature interaction graph and the graph attention network, as shown in FIG. 4, the nodes of the graph attention network correspond to the grids of the defect image, the feature of the nodes is local image embedding, the edges of the graph correspond to the edges of the grid feature interaction graph, the multi-head self-attention mechanism is used to fuse and update the defect information of adjacent nodes in the grid feature interaction graph, and the steps for updating the nodes by using the graph attention network are as follows:

(3.1) The grid features obtained by defining the multi-layer convolutional neural network is expressed as h=($h_1, h_2, \ldots, h_n$), $h_i \in \mathbb{R}^F$, where n represents the number of grids, and F is the feature dimension outputted by the CNN hidden layer;

(3.2) The feature vectors of the two grids are connected according to the adjacency matrix A, and self-attention calculation is conducted for each grid through the nonlinear layer of Leakey ReLU function, as shown in Equation (1):

$$e_{ij}=\text{Leakey ReLU}(V^T[Wh_i \oplus Wh_j]) \quad (1)$$

Where $e_{ij}$ represents the importance of the features of the grid j to the grid i, V and W are learnable parameter matrices, and $\oplus$ represents connection.

(3.3) The softmax function is used to normalize all neighborhood grid features of the grid i to obtain the attention coefficient $\alpha_{ij}$ so that makes it easy to compare the coefficients between different nodes, as shown in Equation (2):

$$\alpha_{ij} = \text{soft}\max_j(e_{ij}) = \frac{\exp(e_{ij})}{\sum_{k \in N_i} \exp(e_{ik})} \quad (2)$$

Where $N_i$ represents all the first-order neighborhood node sets of the grid i in the grid feature interaction graph (including i itself).

(3.4) The features of all adjacent grids j to the grid i are weighted and summed with the corresponding weight coefficient $\alpha_{ij}$, and the final output features of each object node are obtained by the nonlinear layer a, as shown in Equation (3):

$$h'_i = \sigma\left(\sum_{j \in N_i} \alpha_{ij} W h_i\right) \quad (3)$$

(3.5) The method is extended to the multi-head self-attention mechanism in order to improve the performance of the graph attention network.

(4) Decoding and loss function optimization: The training of the reference decoding module and the optimized decoding module is divided into two stages: cross-entropy loss optimization stage and reinforcement learning stage, in which the cross-entropy loss optimization stage is based on the loss function of the negative log-likelihood estimation, and the reinforcement learning stage is based on the reinforcement learning optimization strategy and takes CIDEr score as a reward function.

The decoding module based on Transformer automatically generates the image description by using the updated global and grid feature sequences, specifically, the encoding information of the global features and grid features is transferred to the decoding module of Transformer model, and the decoder translates the next word $w_{t+1}$ in turn according to the currently translated word sequence $w_{1:t}$, thus generating the descriptive sentence $w_{1:T}$ corresponding to the image. Transformer decoding module comprises a reference decoding module and an optimized decoding module, the training of the reference decoding module and the optimized decoding module is divided into two stages: cross-entropy loss optimization stage and reinforcement learning stage, and the specific steps are as follows:

(4.1) In the cross-entropy loss optimization stage, the goal is to make the prediction description consistent with the annotation description; given a decoding module with manual annotation $w_{1:T}^*$ and parameter θ, the following loss function is minimized:

$$L_{XE}(\theta) = -\sum_{t=1}^{T} \log(p_\theta(w_t^* | w_{1:t-1}^*)) \quad (4)$$

Where T is the length of the generated descriptive statement, and $p_\theta(w_t^*|w_{1:t-1}^*)$ represents the probability of decoding module to predict the vector $w_t^*$ of the $t^{th}$ word based on the annotation sequence $w_{1:t-1}^*$ with the length of t−1.

(4.2) In the actual training, Transformer model is weighted and updated on a batch basis, as shown in Equation (5):

$$\text{loss} = -\frac{1}{N}\sum_{n=1}^{N} L_{XE}(\theta) \quad (5)$$

Where N is the size of the batch.

(4.3) In the reinforcement learning stage, based on the loss function training of the negative log-likelihood estimation, the self-critical sequence training strategy is adopted to further optimize the Transformer model with CIDEr score as a reward, as shown in Equation (6):

$$L_{RL}(\theta) = -E_{w_{1:T}} p_\theta[r(w_{1:T})] \quad (6)$$

Where r(·) is the original reward defined based on CIDEr score, and $w_{1:T}$ represents the generated image description sequence with the length of T.

(4.4) The optimization goal in the reinforcement learning stage is to minimize negative expected rewards, and the gradient of average value using the rewards is updated and defined as follows:

$$b = \frac{1}{k}\left(\sum_{i}^{k} r(w_{1:T}^i)\right) \quad (7)$$

$$\nabla_\theta L_{RL}(\theta) \approx -\frac{1}{k}\sum_{i=1}^{k}\left((r(w_{1:T}^i) - b)\nabla_\theta \log p_\theta(w_{1:T}^i)\right) \quad (8)$$

Where k is the number of image description sequences, $w_{1:T}^i$ is the $i^{th}$ image description sequence, and b is the average value of rewards for all image description sequences.

The parameter setting and experimental evaluation criteria are as follows:

A. Experiment Settings:

The detection head of the reformed pre-trained Faster R-CNN model is used to extract the grid features of the defect image, the grid size is 7×7, and the feature dimension of each image is 2048. According to the hyperparameter settings of Transformer model, the model dimension $d_{model}$ is 512, and the number K of multiple attention mechanism heads is 8. The dropout algorithm is used in the experiment to prevent the model from overfitting, and the loss rate is set to 0.1. The experiment is based on PyTorch framework, and Adam gradient optimization algorithm is used for gradient update. The model training is divided into two stages. In the cross-entropy loss optimization training stage, 18 rounds of training are carried out at the initial learning rate is $1\times10^{-4}$, attenuation is performed every 3 cycles, the attenuation rate is 0.8, the loss function of the log-likelihood estimation is optimized, and the batch size is set to 50. In the training stage based on reinforcement learning strategy, 25 rounds of training are carried out at the fixed learning rate of $5\times10^{-6}$, and the batch size was set to 100. In the inference phase, the cluster size is set to 5.

B. Evaluation Indexes:

The involved evaluation indexes are the combination of indexes uniformly used in the existing methods, including BLEU (B1, B2, B3 and B4), METEOR, CIDEr, ROUGE-L and SPICE.

According to the above embodiments, the invention benefits from the rich semantic information of the global image features, realizes a deeper visual understanding, and make reasonable speculation based on global semantics; the invention can generate a more complete and detailed defect description by using the grid feature method, which has more advantages in semantic expression. The invention uses the global node mechanism and the graph attention network in the grid feature interaction graph, which not only captures the contextual important information according to the global features, but also aggregates node information through the graph attention network to capture the dependency relationship and potential interaction between the grids, and enhances the visual features to improve the accuracy of defect description.

Obviously, the technicians in the field should understand that the steps of the automatic concrete dam defect image description generation method based on the graph attention network in the embodiments of the invention can be implemented by a general calculating device, can be concentrated on a single calculating device or can be distributed on a network consisting of multiple calculating devices; optionally, the steps can be implemented by program codes executable by the calculating device, so that they may be stored in the storage device and executed by the calculating device; in some cases, the steps shown or described may be executed in a different order than this text, or they may be made into individual integrated circuit modules, or a number of modules or steps in them are made into a single integrated circuit module. Thus, the embodiments of the invention are not limited to any particular combination of hardware and software.

What is claimed is:

1. An automatic concrete dam defect image description generation method based on graph attention network, characterized by including the following steps:
    1) extracting global features and grid features of a defect image respectively by using a multi-layer convolutional neural network;
    2) constructing a grid feature interaction graph, and inputting the global features and grid features as nodes;
    3) updating and optimizing information of the nodes in the grid feature interaction graph constructed in Step 2) by using the graph attention network to get updated global features and grid features;
    4) automatically generating an image description by using a sequence of the updated global features and grid features based on a Transformer decoding module.

2. The automatic concrete dam defect image description generation method based on graph attention network according to claim 1, characterized in that in Step 1), a Faster R-CNN model pre-trained on a Visual Genome data set is used to extract the global features and grid features, and uses a convolutional layer C5 with a stride of 1 and a 1×1 RoIPool with two FC layers as detection heads, and the output of the convolutional layer C5 is used as the grid features of the defect image.

3. The automatic concrete dam defect image description generation method based on graph attention network according to claim 1, characterized in that in Step 2), the dependency among grid features and the global features are introduced, the grid feature interaction graph is established by means of a global node mechanism, and the grid feature interaction graph is constructed as follows: the global features and grid features obtained in Step 1) are used as node inputs of the grid feature interaction graph to obtain one global node and multiple local nodes; the global node serves as a virtual center and is connected to all nodes in the grid feature interaction graph; the local nodes are connected according to the relative center coordinates of grids, namely, a value (i, j) of two adjacent grid nodes i and j in an adjacency matrix A is assigned as 1, indicating direct interaction, while a value of non-adjacent nodes is assigned as 0, indicating no interaction; the global node collects and distributes general information from the local nodes.

4. The automatic concrete dam defect image description generation method based on graph attention network according to claim 2, characterized in that in Step 1), the grid features and global features of the defect image are extracted for image coding by using the multi-layer convolutional neural network by: adding the global features of the grid feature interaction graph on the basis of fusing the grid features, and extracting the global features and grid features of the defect image; defining the input as a defect image $p_0$=full_image and n fixed size Grids=$(p_1, p_2, \ldots, p_n)$, extracting defect features by using the Faster R-CNN model pre-trained on the Visual Genome data set, and using a convolutional layer C5 with a stride of 1 and a 1×1 RoIPool with two FC layers as detection heads, in which the output of the convolutional layer C5 is embedded in $IE_1$=CNN$(p_{0:n}; \oplus_{CNN})$ as the extracted defect image; $\oplus_{CNN}$ represents the parameters of the Faster R-CNN model, IE includes global image embedding $IE_{Global}$=$IE_0$ and local image embedding $IE_{Local}$=$[IE_1, IE_2, \ldots, IE_n]$, and $p_{0:n}$ means that $p_0$=full_image and Grids=$(p_1, p_2, \ldots, p_n)$ are connected together, representing the input of the full_image and n grids.

5. The automatic concrete dam defect image description generation method based on graph attention network according to claim 1, characterized in that in Step 3), the nodes of the graph attention network based on the grid feature interaction graph correspond to grids of the defect image according to the grid feature interaction graph and the graph attention network, the features of the nodes are local image embeddings, the edges of the graph attention network correspond to the edges of the grid feature interaction graph, and a multi-head self-attention mechanism is used to fuse and update defect information of adjacent nodes in the grid feature interaction graph.

6. The automatic concrete dam defect image description generation method based on graph attention network according to claim 1, characterized in that in Step 4), the Transformer decoding module comprises a reference decoding module and an optimized decoding module, the training of the reference decoding module and the optimized decoding module is divided into two stages: cross-entropy loss optimization stage and reinforcement learning stage, in which the cross-entropy loss optimization stage is based on the loss function of the negative log-likelihood estimation, and the reinforcement learning stage is based on the reinforcement learning optimization strategy and takes CIDEr score as a reward function, where CIDEr refers to Consensus-based Image Description Evaluation, a metric for evaluating image description quality.

7. The automatic concrete dam defect image description generation method based on graph attention network according to claim 1, characterized in that in Step 3), the steps for updating the nodes by using the graph attention network are as follows:
    (3.1) the grid features obtained by defining the multi-layer convolutional neural network are expressed as h=$(h_1, h_2, \ldots, h_n)$, $h_i \in \mathbb{R}^F$, where n represents the number of grids, and F is a feature dimension outputted by a CNN hidden layer;
    (3.2) feature vectors of two grids are connected according to an adjacency matrix A, and a self-attention calculation is conducted for each grid through a nonlinear layer of a Leakey ReLU function, as shown in Equation (1):

$$e_{ij} = \text{Leakey ReLU}(V^T[Wh_i \oplus Wh_j]) \quad (1)$$

where $e_{ij}$ represents the importance of the features of a grid j to a grid i, V and W are learnable parameter matrices, and $\oplus$ represents connection;
    (3.3) a softmax function is used to normalize all neighborhood grid features of the grid i to obtain an attention coefficient $\alpha_{ij}$ so that it is easy to compare the coefficients between different nodes, as shown in Equation (2):

$$\alpha_{ij} = \text{soft}\max_j(e_{ij}) = \frac{\exp(e_{ij})}{\sum_{k \in N_i} \exp(e_{ik})} \quad (2)$$

where $N_i$ represents a set of all first-order neighborhood nodes of the grid i in the grid feature interaction graph, including i itself;

(3.4) features of all adjacent grids j to the grid i are weighted and summed with corresponding weight coefficients $\alpha_{ij}$, and final output features of each object node are obtained by the nonlinear layer $\sigma$, as shown in Equation (3):

$$h'_i = \sigma\left(\sum_{j \in N_i} \alpha_{ij} W h_i\right) \tag{3}$$

(3.5) a method constituted by Steps (3.1)-(3.4) is extended to a multi-head self-attention mechanism.

8. The automatic concrete dam defect image description generation method based on graph attention network according to claim 6, further comprising:

(4.1) in the cross-entropy loss optimization stage, a goal is to make a prediction description consistent with an annotation description; given a decoding module with manual annotation $w_{1:T}^*$ and parameter $\theta$, the following loss function is minimized:

$$L_{XE}(\theta) = -\sum_{t=1}^{T} \log(p_\theta(w_t^* | w_{1:t-1}^*)) \tag{4}$$

where $L_{XE}$ denotes cross-entropy loss, with 'XE' representing Cross-Entropy, T is a length of a generated descriptive statement, and $p_\theta(w_t^*|w_{1:t-1}^*)$ represents a probability of the Transformer decoding module to predict a vector $w_t^*$ of a $t^{th}$ word based on an annotation sequence $w_{1:t-1}^*$ with a length of t−1;

(4.2) in the actual training, the Transformer decoding module is weighted and updated on a batch basis, as shown in Equation (5):

$$\text{loss} = -\frac{1}{N} \sum_{n=1}^{N} L_{XE}(\theta) \tag{5}$$

where N is the size of the batch;

(4.3) in the reinforcement learning stage, based on the loss function training of the negative log-likelihood estimation in Steps (4.1)-(4.2), a self-critical sequence training strategy is adopted to further optimize the Transformer decoding module with CIDEr score as a reward, as shown in Equation (6):

$$L_{RL}(\theta) = -E_{w_{1:T}} p_\theta[r(w_{1:T})] \tag{6}$$

where $r(\cdot)$ is the original reward defined based on CIDEr score, and $w_{1:T}$ represents a generated image description sequence with a length of T;

(4.4) an optimization goal in the reinforcement learning stage is to minimize negative expected rewards, and a gradient of average value using the rewards is updated and defined as follows:

$$b = \frac{1}{k}\left(\sum_{i}^{k} r(w_{1:T}^i)\right) \tag{7}$$

$$\nabla_\theta L_{RL}(\theta) \approx -\frac{1}{k}\sum_{i=1}^{k}\left((r(w_{1:T}^i) - b)\nabla_\theta \log p_\theta(w_{1:T}^i)\right) \tag{8}$$

where $L_{RL}$ denotes the reinforcement learning loss, with 'RL' representing Reinforcement Learning, k is a number of image description sequences, $w_{1:T}^i$ is a $i^{th}$ image description sequence, and b is an average value of rewards for all image description sequences.

9. A computer device, characterized in that the computer device comprises a memory, a processor and a computer program which is stored on the memory and can run on the processor, wherein the processor realizes the automatic concrete dam defect image description generation method based on the graph attention network in any one of claims 1-8 when executing the computer program.

10. A computer readable memory medium, characterized in that the computer readable memory medium stores a computer program, when executed by a computer, causes the computer to perform the automatic concrete dam defect image description generation method based on the graph attention network in any one of claims 1-8.

* * * * *